July 1, 1930. F. V. DONALD 1,768,673
TRACTOR
Filed April 7, 1926
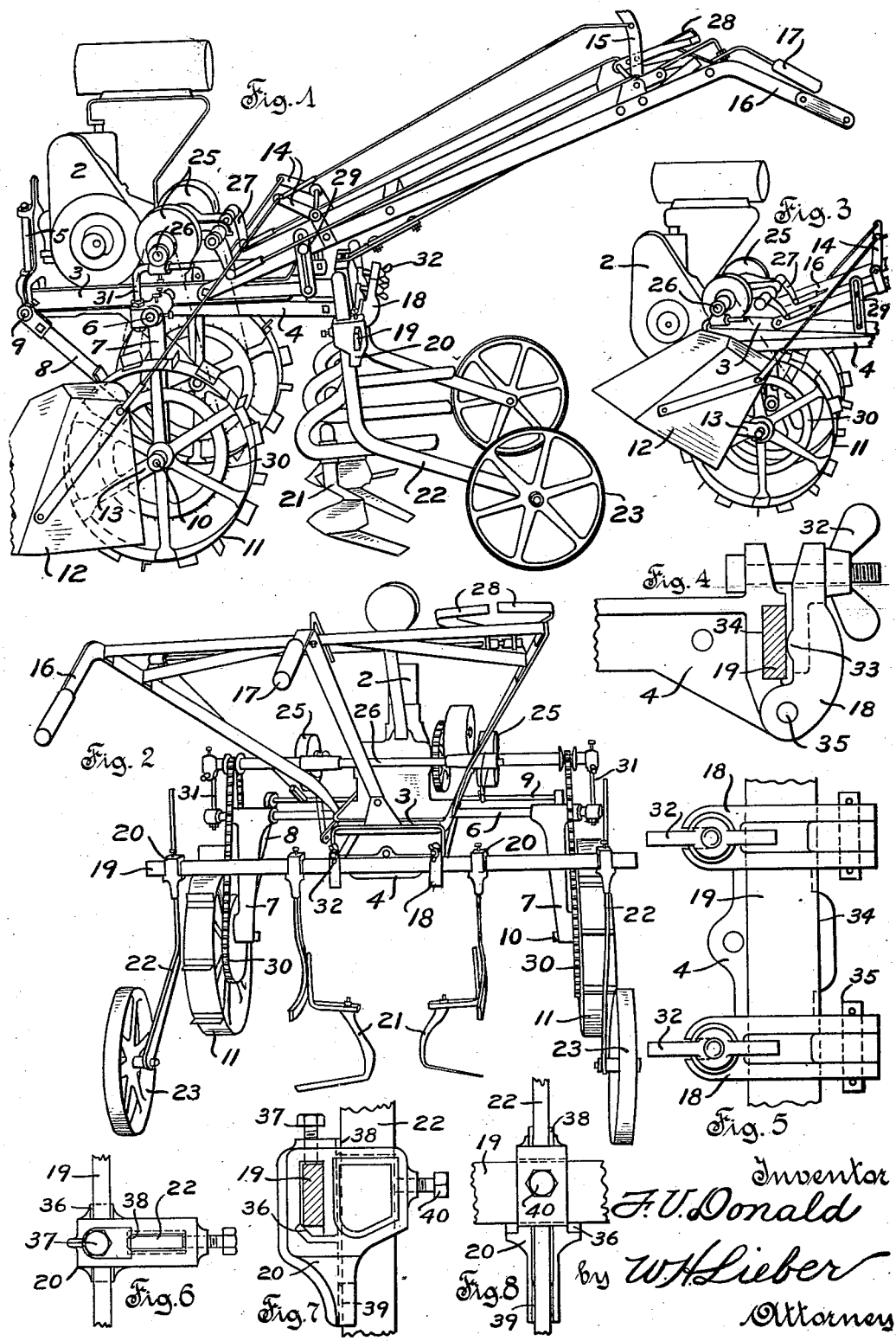
Inventor
F. V. Donald
by W. H. Lieber
Attorney Patented July 1, 1930

1,768,673

UNITED STATES PATENT OFFICE

FORREST V. DONALD, OF PORT WASHINGTON, WISCONSIN, ASSIGNOR TO GILSON MANUFACTURING COMPANY, OF PORT WASHINGTON, WISCONSIN, A CORPORATION OF WISCONSIN

TRACTOR

Application filed April 7, 1926. Serial No. 100,264.

This invention relates in general to improvements in vehicle structures, and relates more specifically to improvements in the construction and operation of general purpose tractors especially adapted for lawn, garden and farm usage.

An object of the invention is to provide an improved tractor which is simple in construction and efficient in operation.

Some of the more important specific objects and advantages of the present invention, are as follows:—

To provide a simple but durable lawn and garden tractor structure, which is flexible in its adaptations and which is conveniently manipulable.

To provide a tractor of the type which is motor driven but wherein the control and guiding is effected by a pedestrian, which is interchangeably connectible to various types of implements and which is adapted for effective cooperation with plant rows of different widths.

To provide improved driving and manipulating mechanisms for tractors or the like, whereby a tractor may be steered either manually or by power, at the will of the operator.

To provide improved leaf and vine guard structures for effectively preventing trash from hindering the progress of a tractor, and for avoiding damage to plants of adjacent rows, and mechanism for readily manipulating such guards.

To provide improved clamp structures for effectively attaching implements or the like to a propelling device, and for enabling rapid disconnection of the implements when desired.

To provide other improvements in the general construction of tractors or the like whereby the cost of construction thereof is reduced to a minimum while the efficiency and utility thereof is enhanced to a maximum.

These and other objects and advantages attainable with the present improvement will be apparent in the course of the accompanying description. A clear conception of embodiments of the several features of the invention, and of the mode of manipulation and operation of devices constructed in accordance therewith, may be had by referring to the drawing accompanying and forming a part of this specification in which like reference characters designate the same or similar parts in the various views.

Fig. 1 is a somewhat diagrammatic side perspective view of a general purpose tractor having several weeding hoes attached thereto.

Fig. 2 is a somewhat diagrammatic rear perspective view of the general purpose tractor and of the weeding hoes.

Fig. 3 is a fragmentary diagrammatic side perspective of the general purpose tractor showing a leaf and vine guard in elevated position.

Fig. 4 is an enlarged side view of an improved clamp for attaching the rear supporting bar to the tractor.

Fig. 5 is an enlarged rear view of the clamps for attaching the rear supporting bar to the tractor.

Fig. 6 is an enlarged top view of one of the improved implement and rear wheel attaching brackets.

Fig. 7 is an enlarged side view of the improved attaching bracket of Fig. 6.

Fig. 8 is an enlarged rear view of the improved attaching bracket of Figs. 6 and 7.

The improved general purpose tractor comprises generally a main frame 3; a motor 2 such as a gasolene engine carried by the main frame 3; a pair of front wheels 11 laterally adjustably associated with the main frame 2; an auxiliary frame 4 located below and pivotally associated with the forward end of the main frame 3 by means of a substantially upright pivot 5; means for relatively swinging the frames 3,4 about the pivot 5 to steer the tractor; a pair of rear wheels 23 laterally adjustably associated with the auxiliary frame 4; and means for interchangeably attaching a variety of implements such as weeding hoes 21 to the auxiliary frame 4.

The main frame 3 may be formed of structural metal and has a substantially triangular guiding frame 16 extending rearwardly therefrom and vertically adjustably associated with the rear of the main frame 3 by means of adjustable supports 29. The medial portion of the main frame 3 has a horizontal transverse supporting rod 6 secured thereto, and a second transverse supporting rod 9 secured to the front of the frame 3 is disposed substantially parallel to the medial rod 6. Depending brackets 7 are adjustably secured to the opposite ends of the medial rod 9, and the lower ends of the brackets 7 carry outwardly projecting pivot shafts 10 which are adjustably connected to the front transverse shaft 9 by means of braces 8 which prevent swinging of the brackets 7 about the shaft 6. The front wheels 11 are rotatably associated with the pivot shafts 10 and may have their paths of travel protected by means of leaf and vine guards 12 as shown in Figs. 1 and 3. The leaf and vine guards 12 may be swingably supported upon the shafts 10 by means of carrier arms 13 and are adjustable from effective position as shown in Fig. 1 to ineffective position as shown in Fig. 3, or vice versa, by means of an adjusting lever 15 carried by the frame 16 and cooperating with motion transmitting arms 14 supported by the forward lower portion of the frame 16.

The medial portion of the main frame 3 also provides a support for a transverse shaft 26 which extends parallel to and is adjustably connected with the medial shaft 6 by means of supports 31. A pair of laterally spaced friction clutches 25 are mounted concentric with the shaft 26 and are operable by means of actuating levers 28 mounted upon the rear of the frame 16 and cooperating with the movable clutch elements through arms 27 mounted upon the main frame 3. The clutches 25 are adapted to either independently or simultaneously connect the front drive wheels 11 to the motor 2, driving connections between the clutches 25 and the wheels 11 being afforded by chain and sprocket mechanisms 30.

A guiding arm 17 extending rearwardly from the auxiliary frame 4 and supported upon the frame 16 constitutes means for relatively swinging the main and auxiliary frames 3, 4 about the front pivot 5. The rear of the auxiliary frame may be provided with a transverse casting having a recess 34 therein within which a transverse bar 19 is adapted to be secured by means of special clamping brackets 18. The transverse bar 19 serves the dual purpose of supporting the implements and of retaining the rear wheels 23 in position, both the wheels and the implements being adjustably associated with the bar 19 by means of special brackets 20. The rear wheels 23 are connected to the end brackets 20 by means of carrier bars 22 and the weeding hoes 21 may likewise be provided with bars for facilitating connection thereof to intermediate brackets 20.

The special clamping brackets 18 shown in detail in Figs. 4 and 5, are swingably connected at their lower ends to the auxiliary frame 4, by means of pivots 35 and have upper bifurcated ends adapted to receive clamping bolts 32. The medial portions of the brackets 18 are provided with local projections 33 which are engageable with the side of the bar 19 to force the latter firmly into the recess 34. The thumb nuts constituting a part of the clamping bolts 32 permit rapid clamping and release of the cross bar 19 from the rear of the tractor and the local clamping projections 33 enable effective clamping with brackets 18 formed of rough castings.

The special clamping brackets 20 shown in detail in Figs. 6, 7 and 8, are slidable along the bar 19 upon release of the set screws 37 and are slidable along the bars 22 upon release of the set screws 40. The lower ends of the openings in the brackets 20 through which the horizontal bar 19 passes, are provided with inclined wedging surfaces 36 against which the set screws 37 are adapted to press the bar 19 to thereby cause the surfaces 36 to force the bar firmly against the side of the opening. The brackets 20 are also provided with upper and lower wedging surfaces 38, 39 disposed above and below the set screw 40 respectively, against which the set screws 40 are adapted to firmly press the vertical bars 22 extending through the brackets 20. The brackets 20 are readily adjustable along the cross rod 19 upon release of the vertical set screw 37, and the upright bars 22 are also vertically adjustable relatively to the brackets 20 upon release of the horizontal set screws 40.

During normal operation of the improved general purpose tractor, the motor 2 is running and both of the clutches 25 are thrown in thereby imparting rotary motion to the front driving wheels 11 through the chain drives 30 and causing the tractor to travel directly forward while the operator walks along at the rear. When the tractor is thus proceeding in a forward direction, the rear wheels 23 are trailing substantially in the planes of the drive wheels 11, and the weeding hoes 21 are functioning to clip the weeds and other vegetation from between the rows of plants which are being cultivated. Normal hand steering is effected by the operator who manipulates the guiding arm 17 relative to the guiding frame 16, thereby causing the auxiliary frame with its rear wheels 23 to swing about the front pivot 5 relatively to the main frame 4 with its drive wheels 11. If the operator desires to make a short turn, he may resort to power steering, by throwing out one or the other of the clutches 25 thereby permitting the effective clutch 25 to drive its wheel 11 about the opposite wheel 11 as a pivot and producing a sharp turn of the tractor. During such sharp turning by power steering, the guiding arm 17 and the rear wheels 23 will automatically assume positions corresponding with the direction of turning by virtue of the front pivot 5 permitting free relative swinging of the frames 3, 4.

When utilizing the leaf and vine guards 12, these guards are in effective position as shown in Fig. 1, and automatically clear the path of the wheels 11, 23. The operator may however elevate the leaf and vine guards to the position shown in Fig. 3, by merely manipulating the lever 15 which simultaneously actuates both of the guards 12. The forward portions of the guards 12 are formed of wedge shape whereby the guards cast the thrash off to either side of the wheel paths.

If it is desired to change the distance between the wheels, the front wheels 11 may be adjusted longitudinally of the retaining rods 6, 9 and the rear wheels 23 may likewise be adjusted longitudinally of the rod 19, to any desired position. During such alteration in the position of the wheels 11, 23, the sleeves connecting the clutches 25 with the chain drives 30 may be lengthened or shortened by the addition or removal of sections, to always maintain a suitable driving connection to the front wheels 11. The tension on the chains of the drives 30 may also be varied by adjustment of the supports 31, thus enabling effective positioning and maintenance of the driving connections.

The position of the control handles and levers may also be readily varied by adjusting the supports 29 thereby varying the inclination of the guiding frame 16 and of the elements supported thereby. By adjusting the rear wheel supporting rods 22 vertically within the brackets 20, the entire tractor may be tilted more or less, and the position of the implements with respect to the ground may be varied either by adjustment of the rods 22 or of the implement supporting rods vertically within the brackets 20. The implements may also be adjusted along the horizontal rod 19 to any desired position thus producing extreme flexibility in the adaptation of the tractor for operation with a variety of implements.

The special clamps 18 permit rapid removal of the implements and of the rear wheels 23 by removal of the cross bar 19 supporting these elements, and these clamps may be manufactured at minimum cost as they require no accurate machining in order to enable them to effectively clamp the bar 19 in place. The special brackets 20 may likewise be produced at minimum cost and serve as effective clamps by virtue of the wedge surfaces 36, 38, 39 formed thereon. The brackets 20 are moreover interchangeable, the wheel and implement supporting clamps being identical in structure.

It should be understood that it is not desired to limit the invention to the exact details of construction and operation herein shown and described, for various modifications within the scope of the claims may occur to persons skilled in the art.

It is claimed and desired to secure by Letters Patent:—

1. In a garden tractor, a main frame having a manipulating handle, vertically adjustably attached thereto and extending rearwardly therefrom, a motor carried directly by said main frame, a pair of supporting and propelling wheels laterally adjustably associated with said main frame, an auxiliary frame vertically pivotally associated with said main frame centrally in advance of said motor, a second manipulating handle attached to said auxiliary frame and extending rearwardly therefrom, a pair of rear supporting wheels laterally adjustably associated with said auxiliary frame in substantial alinement with said propelling wheels, and means for attaching an implement to said auxiliary frame between said wheels, said rear wheels being located entirely below said frames and the space between said wheels and below said frames being free from obstruction other than the implement.

2. In a garden tractor, a main frame having a manipulating handle vertically adjustably attached thereto and extending rearwardly therefrom, a motor carried directly by said main frame, a pair of supporting and propelling wheels laterally adjustably associated with said main frame, an auxiliary frame, vertically pivotally associated with said main frame centrally in advance of said motor, a second manipulating handle attached to said auxiliary frame and extending rearwardly therefrom, a bar secured to and extending transversely across the rear end of said auxiliary frame, a pair of rear supporting wheels laterally adjustably associated with said bar in substantial alinement with said propelling wheels, and means for attaching an implement to said bar between said rear wheels, said rear wheels being located entirely below said bar and the space between said wheels and below said bar being free from obstruction other than the implement.

3. In a garden tractor, a main frame having a manipulating handle vertically adjustably attached thereto and extending rearwardly therefrom, a motor carried directly by said main frame, a pair of supporting and propelling wheels associated with said main frame, an auxiliary frame vertically pivotally associated with said main frame in advance of said motor, a second manipulating handle attached to said auxiliary frame and extending rearwardly therefrom, a bar extending transversely across the rear of said auxiliary frame, a pair of rear supporting wheels adjustably associated with said bar, and means for attaching an implement to said bar between said rear wheels.

In testimony whereof the signature of the inventor is affixed hereto.

FORREST V. DONALD.